United States Patent [19]

Weber et al.

[11] Patent Number: 4,903,617

[45] Date of Patent: Feb. 27, 1990

[54] PROCESS OF REMOVING THE ASH FROM THE GAS PRODUCED BY THE COMBUSTION OF COAL

[75] Inventors: Ekkehard Weber; Reinhard Schulz, both of Essen, Fed. Rep. of Germany

[73] Assignee: Metallgesellschaft Aktiengesellschaft, Frankfurt am Main, Fed. Rep. of Germany

[21] Appl. No.: 280,887

[22] Filed: Dec. 7, 1988

[30] Foreign Application Priority Data

Dec. 9, 1987 [DE] Fed. Rep. of Germany ....... 3741604

[51] Int. Cl.$^4$ .......................... F23J 11/00; F23J 15/00
[52] U.S. Cl. ..................................... 110/345; 55/523; 110/216; 110/347
[58] Field of Search ............... 110/391, 216, 217, 345, 110/347; 422/177; 55/523

[56] References Cited

U.S. PATENT DOCUMENTS

| | | |
|---|---|---|
| 3,615,248 | 10/1971 | Holler, Jr. ....................... 110/216 X |
| 4,055,125 | 10/1977 | Mallek ................................. 110/216 |
| 4,444,129 | 4/1984 | Ladt ................................. 110/216 X |
| 4,574,711 | 3/1986 | Christian . | 
| 4,599,952 | 7/1986 | Meier ................................. 110/216 |
| 4,615,283 | 10/1986 | Ciliberti et al. ....................... 110/216 |
| 4,761,323 | 8/1988 | Muhlratzer et al. .............. 55/523 X |
| 4,772,508 | 9/1988 | Brassell ............................ 55/523 X |

FOREIGN PATENT DOCUMENTS 2308864 11/1976 France .

*Primary Examiner*—Edward G. Favors
*Attorney, Agent, or Firm*—Felfe & Lynch

[57] ABSTRACT

Described is a process in which the liquid ash is removed from a combustion gas which is produced by a combustion of coal with air under a pressure between 2 to 30 bars, wherein the combustion gas at a temperature between 1200° and 1700° C. is passed through at least one porous gas-permeable filter element which is disposed in the combustion chamber. The combustion is effected with a $C:O_2$ mole ratio of 1:0.6 to 1:0.99 and the filter element consists of carbon; carbides of boron, silicon, titanium, zirconium or hafnium; nitrides of boron, silicon, titanium, zirconium or hafnium; borides of titanium, zirconium or hafnium; and/or oxides of aluminum, silicon, magnesium or zirconium.

3 Claims, No Drawings

PROCESS OF REMOVING THE ASH FROM THE GAS PRODUCED BY THE COMBUSTION OF COAL

BACKGROUND OF THE INVENTION

The present invention is in a process for removing liquid ash from a combustion gas which is produced by the combustion of coal with air under a pressure of from 2 to 30 bars, wherein the combustion gas, at a temperature between 1200° and 1700° C., is passed through at least one porous gas-permeable filter element which is disposed in the combustion chamber.

German Patent Application No. P 37 20 963.9 discloses a process wherein air for the combustion of the coal is introduced into the combustion chamber at such a rate that the entire carbon content of the coal is combusted to form $CO_2$ and the resulting combustion gas still has a low carbon content. This means that in the process known from German Patent Application No. P 37 20 963.9 the combustion is carried out with a superstoichiometric oxygen rate.

It has now been found that the useful life of the ceramic filter elements used in the known process and comprising $Al_2O_3$, $SiO_2$, MgO and/or $ZrO_2$ will vary. For this reason it is an object of the invention to provide a process for the removal of liquid ash so the filter element will have a uniform useful life.

THE INVENTION

The above object and others underlying the invention are accomplished in that the combustion of the carbonaceous material is effected with a $C:O_2$ mole ratio of 1:0.6 to 1:0.99 and the filter element consists of carbon, carbides of boron, silicon, titanium, zirconium or hafnium; nitrides of boron, silicon, titanium, zirconium or hafnium; borides of titanium, zirconium or hafnium; and/or oxides of aluminum, silicon, magnesium or zirconium.

Surprisingly it has been found that in the substoichiometric combustion of coal with oxygen supplied at a rate which is insufficient for a complete conversion of the carbon to carbon monoxide, a particularly effective and constantly satisfactory separation of the liquid ash is possible in the presence of reducing combustion gases if, in accordance with the invention, a filter element is used which consists of carbon; carbides of boron, silicon, titanium, zirconium or hafnium; nitrides of boron, silicon, titanium, zirconium or hafnium; borides of titanium, zirconium or hafnium; and/or oxides of aluminum, silicon, magnesium or zirconium. Filter elements composed of carbon, SiC or $Si_3N_4$ have proved particularly satisfactory.

Whereas the substoichiometric combustion of carbonaceous fuels is known per se, it would not have been expected that the liquid ash could be separated by the filter element in accordance with the invention from the resulting reducing combustion gases which contain CO without the filter element clogging. Specifically, no formation of soot, which would clog the filter element and would thus hinder the separation of the liquid ash, is observed during the substoichiometric combustion. The reducing combustion gases are very hot and can readily be subjected to afterburning before or after passing through a gas turbine. As a result, the carbon content of the coal is entirely converted to $CO_2$.

In accordance with a further feature of the invention, the filter element has between 1 and 1000 pores/$cm^2$ and an open porosity of from 30 to 90%. Residual dust contents below 5 mg dust/$m^3$ combustion gas can be obtained where such a filter element is used. The open porosity is the fraction of the pore volume of the filter element in the total volume of that element.

In accordance with a further feature of the invention the combustion air is enriched with oxygen. Such a measure results in desirably high combustion temperatures particularly in the substoichiometric combustion.

The process of the invention can desirably be carried out in the apparatus which is known from German Patent Application Nos. P 37 20 963.9 and P 37 33 337.2, which consists of a combustion chamber that is provided with at least one burner, one flue and one ash discharge device and in which at least one filter element in accordance with the invention is disposed between the burner and the flue in such a manner that the entire combustion gas will pass through the filter element. This means that the filter element must be arranged in the combustion chamber such that the space in which the combustion takes place is separated from those parts of the combustion chamber from which the purified hot combustion gases are discharged. Such an arrangement may be provided because adhesives are known by which the filter element and the refractory lining of the combustion chamber ca firmly be interconnected. The pressure drop caused by the filter element is extremely low and amounts to about 500 Pa.

The filter element to be used in accordance with the invention may be made from the chemical compounds (raw materials) mentioned above in accordance with the following known processes:

(a) sintering of compacts consisting of the raw materials;

(b) impregnation of a sponge with a suspension which contains the raw materials and burning of the impregnated sponge;

(c) sintering of compacts consisting of the raw materials and NaCl and subsequently dissolving the NaCl out of the compact.

It will be understood that the specification and examples are illustrative but not limitative of the present invention and that other embodiments within the spirit and scope of the invention will suggest themselves to those skilled in the art.

We claim:

1. A process of removing liquid ash from a combustion gas comprising:
   combusting coal with air under a pressure between 2 to 30 bars, with a $C:O_2$ mole ratio of 1:0.6 to 1:0.99 to form a combustion gas at a temperature between 1200° and 1700° C.; and
   passing the combustion gas through at least one porous gas-permeable filter element which is disposed in the combustion chamber, the filter element consisting of carbon, carbides of boron, silicon, titanium, zirconium or hafnium, nitrides of boron, silicon, titanium, zirconium or hafnium, borides of titanium, zirconium or hafnium and/or oxides of aluminum, silicon, magnesium or zirconium.

2. The process of claim 1, wherein the filter element has between 1 and 1000 pores/$cm^2$ and an open porosity between 30 and 90%.

3. The process of claim 1, wherein the combustion air is enriched with oxygen.

* * * * *